(12) United States Patent
Mangone

(10) Patent No.: US 7,427,204 B1
(45) Date of Patent: Sep. 23, 2008

(54) DUMMY PLUG APPARATUS WITH UNITARY TAG

(76) Inventor: Peter G. Mangone, 2113 Montane Dr., Golden, CO (US) 80401

( * ) Notice: Subject to any disclaimer, the term of this patent is extended or adjusted under 35 U.S.C. 154(b) by 64 days.

(21) Appl. No.: 11/554,440

(22) Filed: Oct. 30, 2006

(51) Int. Cl.
*H01R 13/44* (2006.01)

(52) U.S. Cl. .................................... 439/148

(58) Field of Classification Search ............... 439/148, 439/142, 135; 174/67
See application file for complete search history.

(56) References Cited

U.S. PATENT DOCUMENTS

| | | | |
|---|---|---|---|
| 3,989,334 A * | 11/1976 | Fortino | 439/148 |
| 4,731,032 A * | 3/1988 | Noorily | 439/136 |
| 4,801,271 A * | 1/1989 | Piper | 439/148 |
| 5,305,380 A | 4/1994 | Hileman et al. | |
| 5,605,467 A * | 2/1997 | Beck et al. | 439/148 |
| 5,964,614 A | 10/1999 | Daoud | |
| 6,309,247 B1 * | 10/2001 | Wang | 439/521 |
| 7,110,533 B2 * | 9/2006 | Cooke | 379/413.04 |
| 2007/0249195 A1 * | 10/2007 | Tomita et al. | 439/148 |

* cited by examiner

*Primary Examiner*—Michael C Zarroli
(74) *Attorney, Agent, or Firm*—Drinker Biddle & Reath LLP

(57) ABSTRACT

In an embodiment, a dummy plug apparatus is provided for insertion into a modular jack to prevent connection/communication with a circuit, device or system that is connected to the jack. An example dummy plug apparatus includes a jack-engaging portion with a tab that releasably engages with a portion of the jack; a tag portion that extends from the jack-engaging portion, the tag portion being configured to bear indicia thereon; and a living hinge that interconnects the jack-engaging portion and the tag portion. The dummy plug apparatus may be configured such that the jack-engaging portion, the tag portion and the living hinge have a structure that is one-piece, unitary or integral-molded or formed.

19 Claims, 3 Drawing Sheets

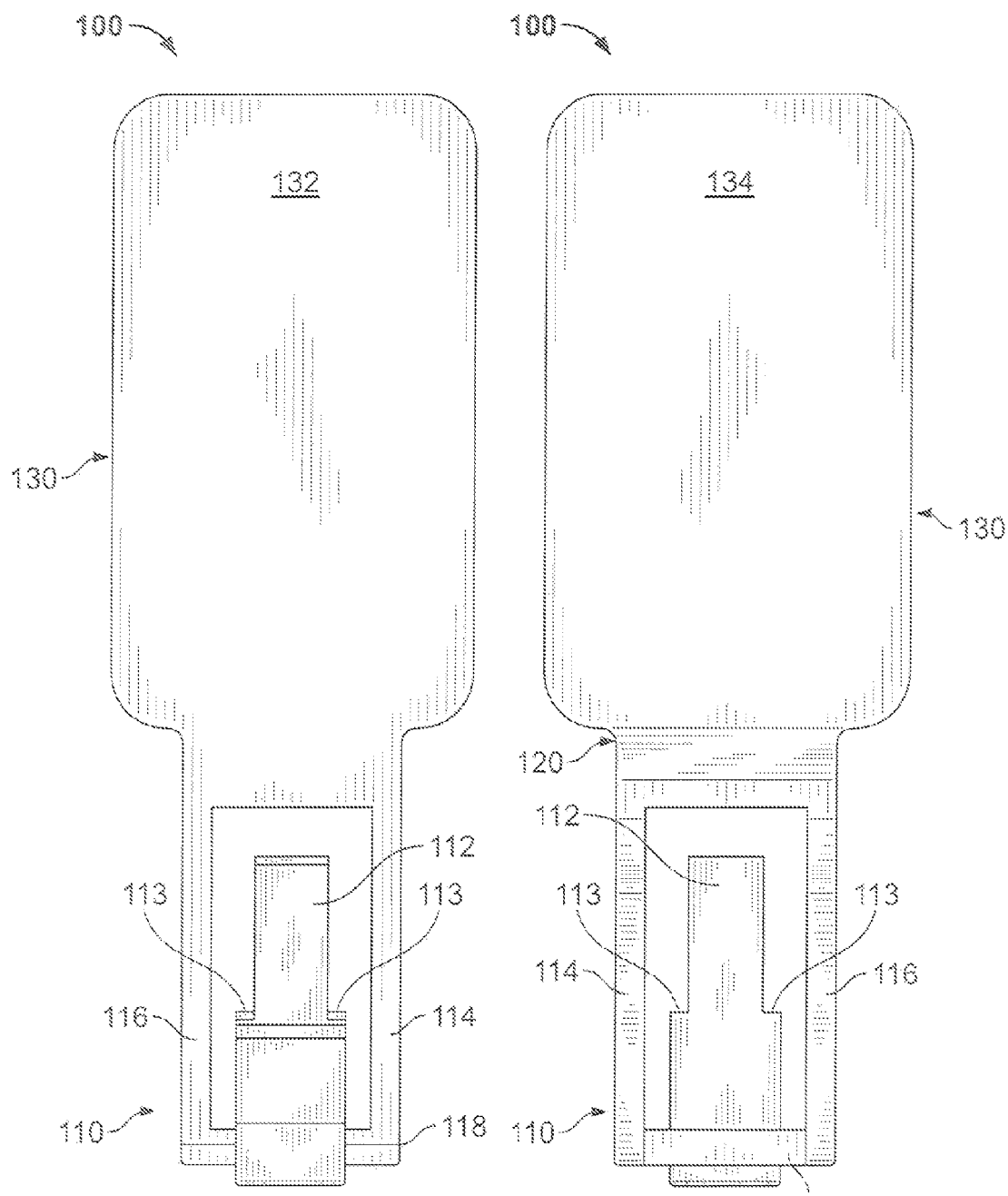

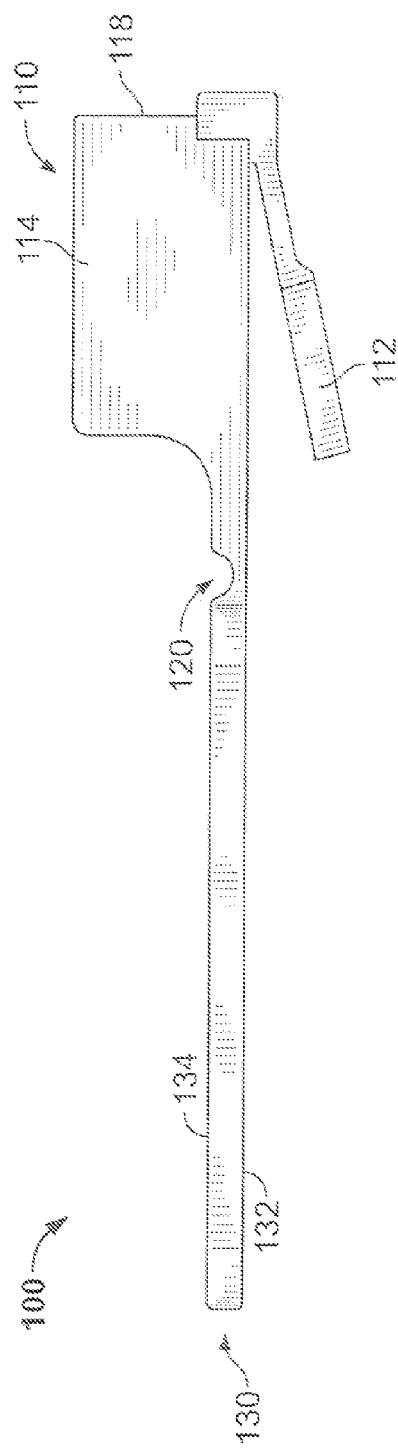
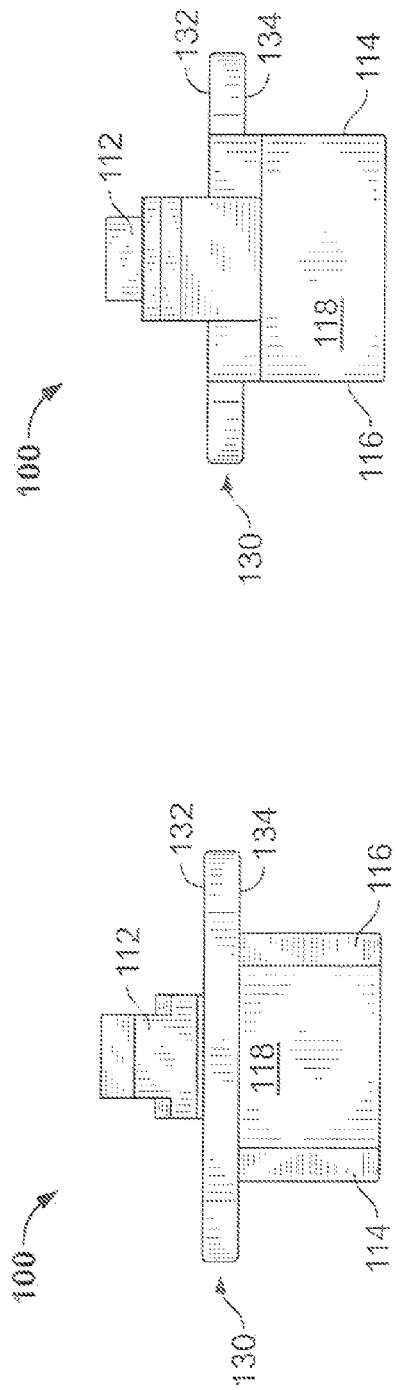
FIG. 5
FIG. 6
FIG. 7

DUMMY PLUG APPARATUS WITH UNITARY TAG

FIELD OF THE INVENTION

The present invention relates generally to electrical connectors and more particularly to modular jacks and plugs used with residential telephone and data devices and systems.

BACKGROUND OF THE INVENTION

Utility companies such as power, water and natural gas providers typically maintain their facilities to a demarcation point (e.g., a meter) where the utility system interfaces with the customer location (e.g., an office, residence, etc.) Because telephone companies use call detail records (CDRs) to bill customers/subscribers for usage, telephone companies do not rely on meters as a demarcation point between customers and the public switched telephone network (PSTN). Instead, the telephone demarcation point is often located in an enclosure known in the art as a network interface device (NID). The NID is usually separated into a telephone company side and customer/subscriber side. The telephone company side of the NID often terminates in a modular jack (e.g., an RJ-11 jack) which a technician may plug into (e.g., with a loopback plug, test set, etc.) for testing and/or troubleshooting the telephone company wiring, for example back to a pedestal or central office. To connect the house or premises wiring (also known as inside wiring) to the telephone company wiring, a jumper cable terminated with a modular plug (e.g., an RJ-11 plug) is inserted into the aforementioned modular jack in the telephone company side of the NID. The other end of the jumper may be hardwired to the customer/subscriber inside wiring or, alternatively, may be terminated in another modular plug which plugs into a modular jack connecter in the customer/subscriber side of the NID. This configuration of modular jacks and jumpers in the NID allows the telephone company wiring and the inside wiring to be isolated from each other for attention to troubleshooting, repair and maintenance responsibilities.

Competition for local telephone service subscribers is growing. Broadband service providers such as cable providers offer digital telephone service, which turns voice calls into digital packets for communication over an IP network such as the internet. By provisioning head-end equipment, a broadband service provider can now offer cable TV service, telephone service and broadband data (i.e., Internet) service using one service drop.

When a cable subscriber elects to convert from standard telephone company-provided phone line (also known as twisted pair, "plain old telephone service" or POTS) to cable-provided phone service, the inside wiring is connected through a cable voice interface device to the cable provider's network. Typically, coaxial cable from the cable company terminates at a cable modem which is connected to a media terminal adapter (MTA). To interface the inside wiring with the cable company system or head end, the MTA is connected to a wall jack or other connection means (e.g., nailed connection, 66-block, etc) of the inside wiring. To isolate the cable equipment from the telephone company, the telephone company feed is disconnected from the inside wiring in the NID by, for example removing or disconnecting the aforementioned jumper at one or both ends.

The modular plug/modular jack/jumper configuration in the NID makes this disconnection/isolation a simple task for the customer or technician. However, a risk exists that, at some point in the future, the customer or a technician may reconnect a jumper to a now-empty modular jack. Cable voice interface devices may be then be exposed to potentially damaging signals from the telephone company feed. Similarly, signals from the MTA may cause damage to telephone company equipment, for example echo cancellers, digital cross connects and switches as the central office. One way to prevent reconnection is to remove the inside wiring from the NID and provide a new hard-wired connection or cross-connect from the inside wiring to the cable voice interface. However, this solution adds labor and equipment cost to the installation of the cable-provided phone service.

In view of the foregoing, an efficient apparatus for preventing the reconnection of a modular plug to a modular jack would be an important improvement in the art.

BRIEF SUMMARY OF THE INVENTION

In an embodiment, a dummy plug apparatus is provided for insertion into a modular jack to prevent connection/communication with a circuit, device or system that is connected to the jack. A dummy plug apparatus in accordance with the present invention comprises a jack-engaging portion including a tab that releasably engages with a portion of the jack; a tag portion that extends from the jack-engaging portion, the tag portion being configured to bear indicia: and a living hinge that interconnects the jack-engaging portion and the tag portion. The dummy plug apparatus may be configured such that the jack-engaging portion, the tag portion and the living hinge have a one-piece, unitary or integrally-molded or formed structure.

BRIEF DESCRIPTION OF THE DRAWINGS

FIG. 3 illustrates a bottom plan view of the example dummy plug apparatus of FIG. 1;

FIG. 4 illustrates a top plan view of the example dummy plug apparatus of FIG. 1;

FIG. 5 illustrates a side elevation view of the example dummy plug apparatus of FIG. 1;

FIG. 6 illustrates a rear elevation view of the example dummy plug apparatus of FIG. 1; and FIG. 7 illustrates a front elevation view of the example dummy plug apparatus of FIG. 1.

DETAILED DESCRIPTION OF THE EMBODIMENTS

Figure 1:
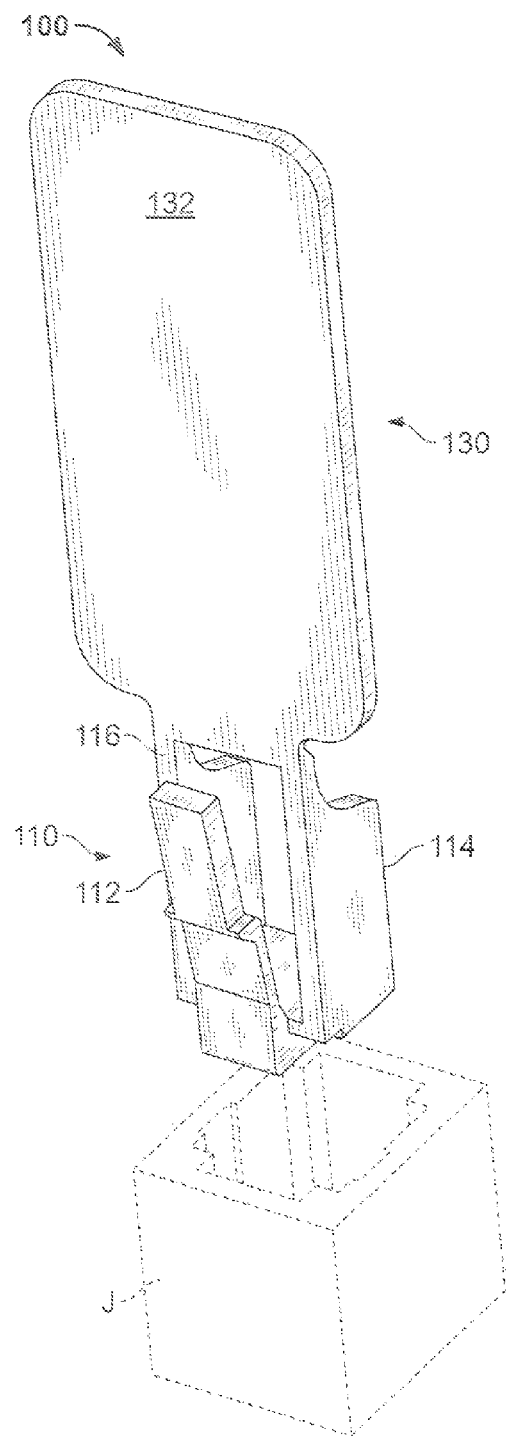
FIG. 1 illustrates a bottom perspective view of an example dummy plug apparatus being inserted into a modular-type jack.

Referring now to the Figures, a dummy plug apparatus is provided. An example dummy plug apparatus 100 is illustrated in FIGS. 1-7. As shown in FIG. 1, the example dummy plug apparatus 100 is configured for insertion in a modular jack J such as an RJ-type (e.g., RJ-11, RJ-45, etc.) modular jack that is connected to voice (e.g., telephone) and/or data (e.g., Internet) circuitry, devices and systems. As known in the art, by inserting a complementary modular plug (not shown) into the jack J, voice and/or data devices (e.g., computers, telephones, facsimile machines, etc.) may be connected to other devices (e.g., switches, routers, modems, etc.) and/or service providers/voice and data systems (e.g., the internet, PSTN, etc.) In instances where it is required or desirable to prevent access to a device, circuit or system connected to the jack J, the example dummy plug apparatus 100 may be inserted therein.

Figure 2:
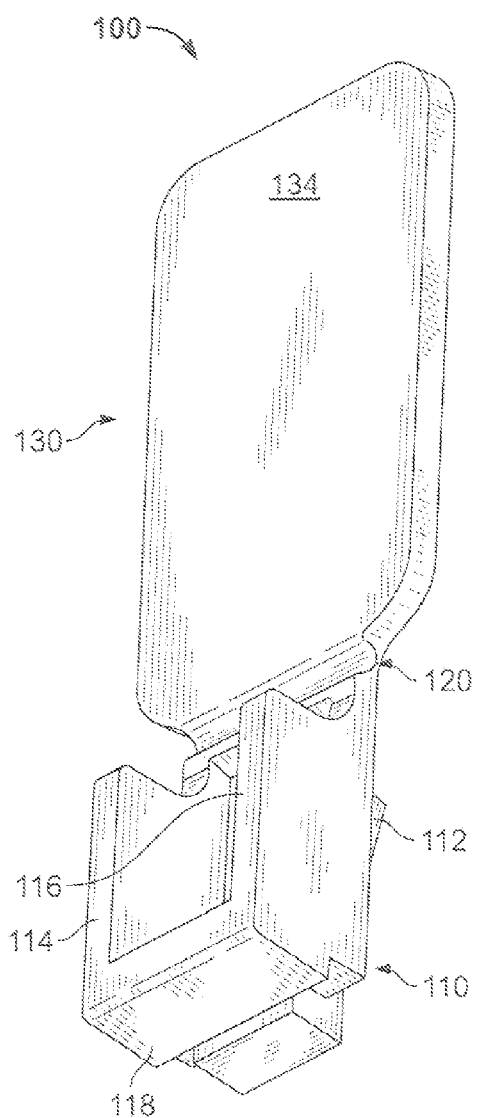
FIG. 2 illustrates a top perspective view of the example dummy plug apparatus of FIG. 1.

As shown in the Figures, the apparatus 100 includes a jack-engaging portion 110 at its front and a tag portion 130 at its rear. The jack-engaging portion 110 and the tag portion 130 are integrally, unitarily or one-piece formed, machined, molded or otherwise manufactured of a non-conductive, dielectric or insulating material such as a plastic so that the apparatus 100 does not short-circuit or otherwise conduct with contacts (not shown) in a chamber, which is configured to receive a modular plug, of the jack J. As illustrated in FIGS. 1 and 2, the jack-engaging portion 110 includes a tab 112, a first sidewall 114, a second sidewall 116 and a front wall 118. As shown in FIGS. 1-4 and 6, the first and second sidewalls 114, 116 are generally parallel to each other and spaced apart a predetermined distance to generally correspond with a width of the modular plug-receiving chamber of the jack J. Furthermore, the first and second sidewalls 114, 116 extend a predetermined distance rearward from the front wall 118 to generally correspond with a depth of the modular plug-receiving chamber of the jack J. The front wall 118 is unitary with the first and second sidewalls 114, 116 and extends between front ends of the first and second sidewalls 114, 116 as shown in FIG. 2. As shown in FIGS. 1-4 and 6, the first and second sidewalls 114, 116 together with the front wall 118 from a generally square U-shaped channel with open top, bottom and rearward ends.

As further shown in FIG. 5, the tab 112 includes a front end connected to a bottom portion of the front wall 118 and a free distal end. The table 112 extends obliquely downward and rearward from its front end to its free distal end. As known in the art, the tab 112 is biased away from the bottom edges of the first and second sidewalls 114, 116 so that when the apparatus 100 is inserted in the jack J, a portion of the tab 112 (e.g., the shoulder portions 113 best shown in FIGS. 3 and 4) engages with an internal portion (e.g., a wall or ledge) of the modular plug-receiving chamber of jack J with an interference fit. Thus, the tab 112 prevents the apparatus 100 from being removed or accidentally disengaged from the jack J. By moving the tab 112 upwardly (i.e., toward the bottom edges of the first and second sidewalls 114, 116), the apparatus 100 may be disengaged from the jack J and subsequently removed therefrom.

As shown in FIGS. 1, 2 and 5 the tag portion 130 extends rearward from the jack-engaging portion 110 and is generally rectangular in shape. In one embodiment of the apparatus 100, the generally rectangular tag portion 130 is about one inch long and about one half inch wide, however, the tag portion 130 maybe larger or small as desired. Furthermore, although illustrated to be generally rectangular in shape, the tag portion 130 may alternatively be configured in other shapes as desired, for example, square, circular, curvilinear, polylinear, etc. The tag portion 130 as shown includes a generally planar bottom surface 132 and a generally planar top surface 134. As can be further appreciated, the tag portion 130 may be configured to be grasped by a user for facilitating insertion into or removal from the jack J. For example, one or more of the surfaces 132, 134 may include a surface treatment such as knurling, roughening or texturizing to improve a user's grip on the apparatus 100.

Although not illustrated, one or more of the bottom and top surfaces 132, 134 may bear indicia (e.g., alphanumeric characters, symbols, etc.) for the purposes of identifying the jack J and/or an associated circuit/device/system connected thereto. Furthermore, the indicia may additionally or alternatively provide an instruction/warming to an individual such as a technician, installer or customer regarding the jack and/or the associated circuit/device/system. In an example, the bottom and top surfaces 132, 134 may be configured such that the top surface 134 may bear jack or circuit-identifying indicia whereas the bottom surface 132 may bear an instruction/warming relative to that same jack or circuit (or vice versa). In some embodiments, the indicia may be temporarily or permanently applied to the surfaces 132, 134 with a wiring implement (e.g., marker, pen, pencil, etc.) or by way of an adhesive label, sticker or the like. However, in other embodiments the indicia may be molded or formed on one or more of the bottom and top surfaces 132, 134. Furthermore, the apparatus 100 or a portion thereof (e.g., the tag portion 130) may bear an integral indicia such as a color that corresponds to a predetermined color code or status/circuit identification system.

As best shown in FIGS. 2, 4 and 5, the jack-engaging portion 110 and the tag portion 130 are interconnected by a living hinge 120. As can be appreciated, the living hinge 120 may be molded or formed substantially simultaneously with the molding or forming of the jack-engaging portion 110 and the tag portion 130. As shown in FIG. 5, the living hinge 120 comprises a generally U-shaped or hemi-cylindrical channel or indentation that extends along the hinge 120 between the rearward ends of the first and second sidewalls 114, 116 to ensure flexure along the hinge 120. Although the living hinge 120 is illustrated as having a generally U-shaped or hemi-cylindrical channel or indentation, the living hinge 120 may be configured otherwise, for example with a V-shaped channel or lengthwise notch.

In one embodiment, the living hinge 120 may be biased to a normal orientation so that the tag portion 130, when pivoted upward or downward, returns to a position that is generally parallel with the bottom edges of the first and second sidewalls 114, 116. Alternatively, the living hinge 120 may be biased otherwise so that, for example, the tag portion 130 is oriented to be perpendicular or oblique to the bottom edges of the first and second sidewalls 114, 116. In this way, the tag portion 130 may be moved by the normal bias of the living hinge 120 so that indicia on one of the surfaces 132, 134 may be best oriented for reading. As can be appreciated, the living hinge 120 facilitates installation of the apparatus 100 is various orientations and configurations. Owing to the living hinge 120, the tag portion 130 may be pivoted by an individual (e.g., a technician, installer or customer) for reading/viewing the indicia thereon. Furthermore, the living hinge 120 is configured to pivot the tag portion 130 so that the tag portion 130 can be rotated upward or downward relative to the jack-engaging portion 110. For example, in one embodiment, the living hinge 120 may be configured to pivot the tag portion 130 through an angle of about 180°, that is, about 90° upward and about 90° downward relative to the illustrated orientation shown in FIG. 5, so that the tag portion 130 may be oriented in various positions. As such the apparatus 100 may be inserted in a jack J that is configured in an enclosure or housing that has limited front clearance without interfering with closure/sealing of the enclosure or housing. In this way, an apparatus 100 including a tag portion 130 that extends substantially from the jack-engaging portion 110 may be used for various applications without the need to change/replace an enclosure or housing and without decreasing front clearance.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples or exemplary languages (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Various embodiments of this invention are described herein. It should be understood that the illustrated embodiments are exemplary only, and should not be taken as limiting the scope of the invention.

What is claimed is:

1. A one-piece dummy plug apparatus for insertion in a voice or data jack, the apparatus comprising:
    a jack-engaging portion including a tab that releasably engages with a portion of the jack;
    a tag portion that extends from the jack-engaging portion, the tag portion being configured to bear indicia thereon, the tag portion further including a first generally planar surface bearing first indicia and a second generally planar surface bearing second indicia; and
    a living hinge that interconnects the jack-engaging portion and the tag portion.

2. The apparatus of claim 1 wherein the jack-engaging portion is configured for insertion in an RJ-type jack.

3. The apparatus of claim 1 wherein the indicia comprises a color.

4. The apparatus of claim 1 wherein the living hinge includes a bias that urges the tag portion into an orientation that is generally perpendicular with a bottom surface of the jack-engaging portion.

5. The apparatus of claim 1 wherein the indicia is molded on a surface of the tag portion.

6. The apparatus of claim 1 wherein the living hinge is configured to pivot the tag portion through an angle of about 180°.

7. The apparatus of claim 1 wherein the living hinge includes a bias that urges the tag portion into an orientation that is generally parallel with a bottom surface of the jack-engaging portion.

8. The apparatus of claim 1 wherein the living hinge includes a bias that urges the tag portion into an orientation that is generally perpendicular with a bottom surface of the jack-engaging portion.

9. The apparatus of claim 1 wherein the living hinge includes a bias that urges the tag portion into an orientation that is generally oblique relative to a bottom surface of the jack-engaging portion.

10. A one-piece dummy plug apparatus for insertion in a voice or data jack, the apparatus comprising:
    a jack-engaging portion including a tab that releasably engages with a portion of the jack;
    a tag portion that extends from the jack-engaging portion, the tag portion being configured to bear indicia thereon; and
    a living hinge that interconnects the jack-engaging portion and includes a bias that urges the tag portion toward an orientation that is generally parallel with a bottom surface of the jack-engaging portion.

11. The apparatus of claim 10 wherein the jack-engaging portion, the tag portion and the living hinge are unitarily molded.

12. The apparatus of claim 10 wherein the tag portion is generally rectangular in shape.

13. The apparatus of claim 10 wherein the tag portion comprises a surface treatment to facilitate insertion and removal of the apparatus from the jack.

14. A one-piece dummy plug apparatus for insertion in a voice or data jack, the apparatus comprising:
    a jack-engaging portion including a tab that releasably engages with a portion of the jack;
    a tag portion that extends from the jack-engaging portion, the tag portion being configured to bear indicia thereon; and
    a living hinge that interconnects the jack-engaging portion and the tag portion and includes a bias that urges the tag portion toward an orientation that is generally oblique relative to a bottom surface of the jack-engaging portion.

15. The apparatus of claim 14 wherein the jack-engaging portion, the tag portion and the living hinge are unitarily molded.

16. The apparatus of claim 14 wherein the jack-engaging portion is configured for insertion in an RJ-type jack.

17. The apparatus of claim 14 wherein the tag portion is generally rectangular in shape.

18. The apparatus of claim 14 wherein the tag portion comprises a surface treatment to facilitate insertion and removal of the apparatus from the jack.

19. The apparatus of claim 10 wherein the jack-engaging portion is configured for insertion in an RJ-type jack.

* * * * *